(12) United States Patent
Todd et al.

(10) Patent No.: US 8,335,709 B2
(45) Date of Patent: Dec. 18, 2012

(54) CUSTOMER SURVEY DEVICE WITH FRAUD PREVENTION SYSTEM

(75) Inventors: Kenneth J. Todd, Plano, TX (US); Kenneth J. Lovegreen, Lake Kiowa, TX (US)

(73) Assignee: Long Range Systems, LLC, Addison, TX (US)

( * ) Notice: Subject to any disclaimer, the term of this patent is extended or adjusted under 35 U.S.C. 154(b) by 71 days.

(21) Appl. No.: 12/807,229

(22) Filed: Aug. 31, 2010

(65) Prior Publication Data

US 2012/0054016 A1     Mar. 1, 2012

(51) Int. Cl.
  *G06Q 10/00* (2006.01)
  *G09B 3/00* (2006.01)
(52) U.S. Cl. ......... 705/7.32; 705/15; 434/355; 434/362; 348/150; 348/151; 348/158
(58) Field of Classification Search .................. 705/7.11, 705/7.15, 7.28, 7.26, 7, 29, 7.32, 26.1; 340/286.09, 340/266.09; 348/143, 150, 151, 161; 434/143, 434/150, 151, 161
See application file for complete search history.

(56) References Cited

U.S. PATENT DOCUMENTS

| | | | |
|---|---|---|---|
| 5,814,968 A | 9/1998 | Lovegreen et al. | |
| 5,893,075 A | 4/1999 | Plainfield et al. | |
| 6,513,014 B1 * | 1/2003 | Walker et al. | 705/7.32 |
| 6,542,751 B1 | 4/2003 | Blink et al. | |
| 6,573,824 B1 | 6/2003 | Lovegreen et al. | |
| 6,616,458 B1 * | 9/2003 | Walker et al. | 434/322 |
| 6,960,988 B2 | 11/2005 | Blink et al. | |
| 7,006,982 B2 * | 2/2006 | Sorensen | 705/7.29 |
| 7,062,281 B2 | 6/2006 | Blink et al. | |
| 7,292,723 B2 * | 11/2007 | Tedesco et al. | 382/159 |
| 7,383,200 B1 * | 6/2008 | Walker et al. | 705/7.15 |
| 7,652,558 B2 | 1/2010 | Lovegreen et al. | |
| 7,873,589 B2 * | 1/2011 | Shiffman et al. | 706/47 |
| 7,933,797 B2 * | 4/2011 | Sorensen | 705/7.32 |
| 7,953,219 B2 * | 5/2011 | Freedman et al. | 379/265.06 |
| 7,974,867 B2 * | 7/2011 | Gracie et al. | 705/7.28 |
| 8,041,667 B2 * | 10/2011 | Otto et al. | 706/47 |
| 8,055,548 B2 * | 11/2011 | Staib et al. | 705/26.1 |
| 8,078,485 B1 * | 12/2011 | Kraehmueller et al. | 705/7.11 |
| 8,131,577 B2 * | 3/2012 | Lessing et al. | 705/7.11 |
| 8,150,750 B2 * | 4/2012 | Ray | 705/35 |
| 2004/0252816 A1 * | 12/2004 | Nicolas | 379/92.01 |
| 2008/0103800 A1 * | 5/2008 | Domenikos et al. | 705/1 |
| 2009/0106084 A1 * | 4/2009 | Or | 705/10 |

* cited by examiner

*Primary Examiner* — Andrew Joseph Rudy (57) ABSTRACT

A restaurant customer-survey system and device, which reduces employee fraud when a customer-satisfaction survey embedded in the device is conducted. The survey may be implemented in a pager, tip tray, or other computing device that includes an internally mounted camera that covertly takes a photograph of the survey participant. The photograph is date/time stamped and associated with a table number so that the waiter for the table can be identified. The survey results together with the associated photograph are uploaded to a management database. The restaurant manager can review the photographs to ensure that employees are not fraudulently conducting the surveys rather than customers. The system also enables the customer to interface with the restaurant's point-of-sale (POS) system to retrieve the customer's current bill or wirelessly make a payment from the table.

17 Claims, 6 Drawing Sheets

CUSTOMER SURVEY DEVICE WITH FRAUD PREVENTION SYSTEM

BACKGROUND

1. Technical Field

This invention relates to customer survey systems and, more particularly, to a customer survey system with an imaging system to prevent fraudulent surveys by employees.

2. Description of Related Art

Figure 1:
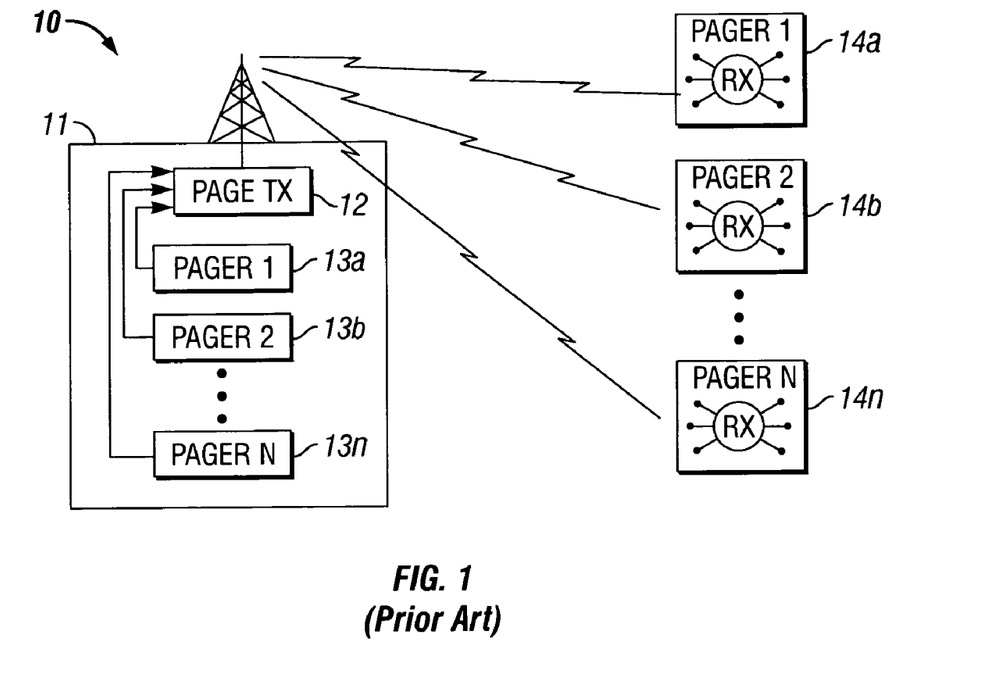
FIG. 1 (Prior Art) is a simplified block diagram of an existing on-premises paging system.

FIG. 1 is a simplified block diagram of an existing on-premises paging system 10, such as a paging system used in business establishments while customers wait for services to be performed, or in eating or drinking establishments such as restaurants to notify waiting customers that a table is available. A centralized control station 11 includes a page transmitter 12 and, for example, a plurality of buttons 13a-13n which may be pressed individually to send a page to one of an associated plurality of pagers 14a-14n.

Figure 2:
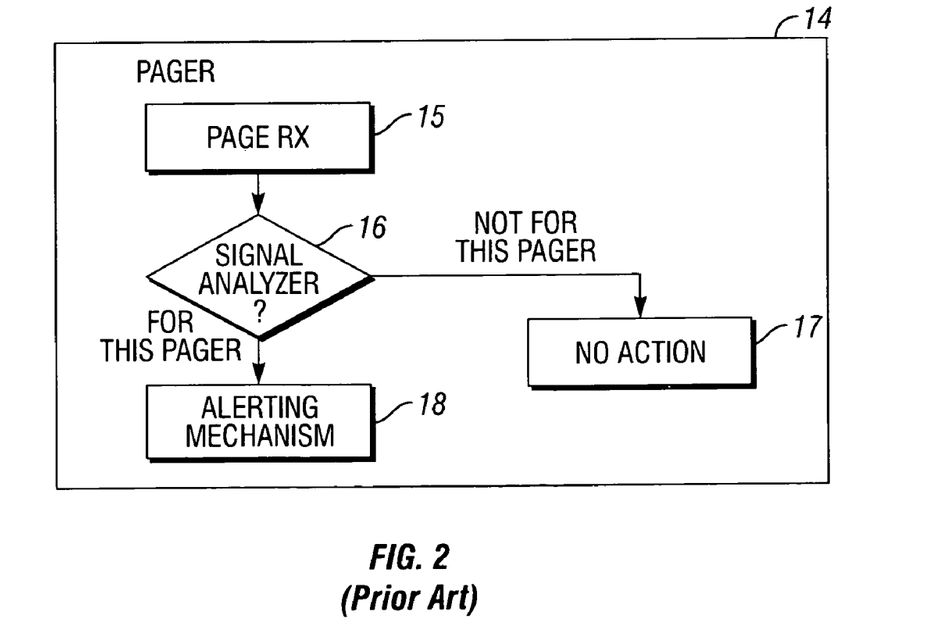
FIG. 2 (Prior Art) is a simplified functional block diagram of one of the plurality of pagers in the existing system of FIG. 1.

FIG. 2 is a simplified functional block diagram of one of the plurality of pagers 14 in the existing system of FIG. 1. The pager includes a page receiver 15 and a signal analyzer 16, which determines whether a received signal is intended for that pager. If the received signal is not intended for that pager, the pager takes no action as shown at 17. If the received signal is intended for that pager, the pager activates an alerting mechanism 18, which alerts the user that a page has been received. In the example of an on-premises paging system in a restaurant, lights in the pager may flash, or the pager may vibrate or beep to indicate to the customer that a table is ready.

In many restaurants, the wait for a table may be long and boring. To help solve this problem, the Applicants previously obtained U.S. Pat. No. 6,573,824 for a Combination Paging and Gaming System and Apparatus, which is incorporated herein by reference in its entirety. The Combination Paging and Gaming System enables a user to utilize a pager to play an electronic game while waiting for a page.

With the previous system, however, the customer was typically required to relinquish the game pager when the customer's table was ready. This was a disadvantage in situations where a member of the customer's party desired to continue playing the game while waiting for the food order to be delivered to the table.

Other existing paging systems also fail to address additional problems that customers typically encounter when dining at a restaurant. For example, when a customer has a request for his waiter, the customer typically has to wait for the waiter to notice him or come to the table for another reason. It can be frustrating to customers when their waiter disappears for an extended period when the customer requires some service. Additionally, in the past, the customer has not had the ability to check his current bill during the meal or pay electronically from the table. Typically, the customer has to wait until the meal is completed, and the final check is delivered to the table, to discover the amount of the bill. The customer must then wait for his waiter to collect the payment from the table, record the payment through the point-of-sale (POS) system, and return with a receipt or credit card printout for the customer's signature.

It is also known in the art to utilize computer-based devices to collect customer information. For example, U.S. Pat. No. 5,893,075 to Plainfield et al. discloses a PC-based, interactive, programmable system that induces customers of a restaurant to enter information about themselves or to answer survey questions. The program is run on a PC, and the customer enters the information in data fields displayed on the PC's monitor. The Plainfield system is bulky, however, and is devoted to only this one task.

U.S. Pat. No. 6,960,988 to Blink et al. assigned to the Assignee of the instant application, solves some of the above problems through the use of a multi-function customer satisfaction survey device that also functions as a restaurant tip tray and calculator. Survey questions are presented on a display screen, and the customer enters responses using a survey keypad. The responses are stored in a memory in the tray. The trays stack on a base unit that simultaneously collects the responses from the stacked trays, simultaneously programs the stacked trays with survey questions, and simultaneously recharges a battery in each tray. The Blink device, however, is not appropriate for use in some restaurant settings such as fast-food restaurants, or in other retail business establishments where tip trays are not utilized.

U.S. Pat. No. 7,652,558 to Lovegreen et al., also assigned to the Assignee of the instant application, solves additional problems through the use of a multi-function customer satisfaction survey device that also functions as a restaurant tip tray with wireless point-of-sale (POS) connectivity. The Lovegreen device enables the customer to wirelessly access the POS system to check his current bill during the meal or to pay electronically from the table.

All existing customer-survey devices, however, suffer from the problem of fraudulent surveys that are actually filled out by an employee such as a waiter rather than the customer. There is currently no way to detect such fraudulent surveys.

SUMMARY OF THE INVENTION

In one embodiment, the present invention is directed to a customer-survey device for use by a customer in a business establishment. The customer-survey device includes means for presenting questions to the customer regarding the customer's level of satisfaction with the business establishment or its products or services; means for electronically recording the customer's answers to the questions; and means for detecting when an employee fraudulently takes the customer-satisfaction survey instead of the customer. In a particular embodiment, the means for detecting when an employee fraudulently takes the customer-satisfaction survey includes a camera for taking a photograph of an individual taking the customer-satisfaction survey, and means for associating the photograph with the customer-satisfaction survey.

In another embodiment, the present invention is directed to a restaurant customer-survey system. The system includes a device accessible by a customer to take a customer-satisfaction survey, and a central control station. The device includes means for presenting questions to the customer regarding the customer's level of satisfaction with the restaurant and services provided by the restaurant's employees; means for electronically recording the customer's answers to the questions; and means for detecting when an employee fraudulently takes the customer-satisfaction survey instead of the customer. The central control station includes an interface for electronically communicating with the device and for uploading fraud-related information from the device; and an interface to a management database for providing the fraud-related information to the management database. In a particular embodiment, the means for detecting when an employee fraudulently takes the customer-satisfaction survey includes a camera for taking a photograph of an individual taking the customer-satisfaction survey, and means for associating the photograph with the customer-satisfaction survey.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

In one embodiment, the present invention provides an on-premises paging system. In a business establishment such as, for example, a restaurant, a hostess may provide an on-premises pager to a customer. If the restaurant is full and the customer is going to have to wait for a table, a principal function of the pager is to notify the customer when his/her table is ready. The pager also includes a built-in game, such as a trivia game, which the customer can play while waiting for a page to be received. The game pager may periodically display an advertising screen, which advertises specials being offered by the restaurant, or advertises goods or services of third parties who may pay the restaurant to display their advertisements.

The system also includes features that make it useful for customers to keep the pager at their table after they have been seated. First, they can continue to play the game while waiting to be served. Second, the game pager includes a wireless interface to the restaurant's POS system. This enables the customer to check the current bill during the meal or to pay electronically from the table when the meal is complete. Third, the customer can press a button for service when he needs his waiter to come to the table. In one embodiment, this sends the pager number to a central control station, which associates the pager number with a table number. An interface with the POS system enables the system to match the table number to a waiter. The system or a manager can then page the waiter and let him know he is needed at the customer's table.

An additional feature of the game pager is the inclusion of a customer satisfaction survey in the pager. The customer can answer a series of questions about the quality of the food, level of service by the wait staff, and general satisfaction with his dining experience.

To overcome the existing problem of fraudulent surveys that are actually filled out by employees rather than customers, the game pager includes a camera that covertly takes a photograph of the participant taking the survey. The pager may wirelessly upload the photograph to a management site where the photograph is used to confirm that the participant was not an employee. This should greatly reduce employee fraud and significantly increase the validity of the data collected in the customer surveys.

Figure 3:
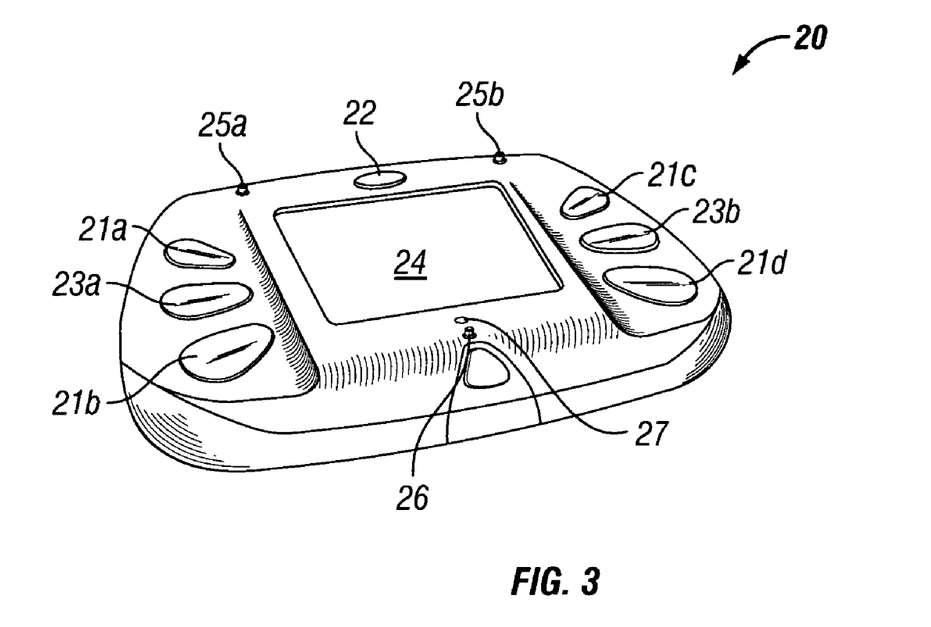
FIG. 3 is a perspective view of an exemplary embodiment of the game and survey pager of the present invention.

FIG. 3 is a perspective view of an exemplary embodiment of the game and survey pager 20 of the present invention. The pager includes a keypad comprising a number of game answer keys (A-D) 21a-21d, a menu key 22, and two multi-function keys 23a and 23b, the functions of which are controlled by an internal control processor and displayed on a display screen 24, which may be an LCD display screen. When the menu key 22 is pressed, the customer is shown selected items from the restaurant's menu. One of the multi-function keys may be programmed to cause the pager to transmit a request for service to a central control station, requesting a waiter to come to the customer. If the customer requests service before being seated, the customer's pager may light up in a distinctive manner indicating that the customer has called for a waiter, and thus enabling the waiter to more easily identify the customer. In this way, customers can order drinks, for example, while they wait for a table. In some restaurants, the customer may also keep the pager after being seated. In this way, the customer can continue to play the game while waiting for his/her food to be served. When the customer is seated, the hostess enters the table number where the customer is seated into the paging system. In this way, the customer can use the pager to call for service, and the table number is known.

The game and survey pager 20 may be used to play different kinds of games. For example, the game may be self-contained, or game questions (such as trivia questions) may be sent to the pager via a base unit 30 (FIG. 4) or wireless link. Games of chance may also be played on the pager, and odds for the game may be sent to the pager via the base unit or wireless link.

The LCD display screen is also used to display game questions, game boards, games of chance such as card games, and advertising, which may include graphics and/or video. Also shown in FIG. 3 are two charging pins 25a and 25b, which are used to transfer charging power to another game and survey pager when the other pager is stacked on top of the illustrated pager 20. A third pin 26 may be a data pin, utilized to transfer data such as game questions, game answers, odds for games of chance, advertising, and restaurant menu information from the base unit 30 to pagers stacked thereon. The third pin may also be used to download information such as customer responses to survey questions or advertising. In another embodiment, the third pin 26 is a dummy pin that does not perform any electrical functions. The dummy pin is utilized only to provide physical support to pagers stacked above the illustrated pager so that they remain level. Not shown in this illustration, are a number of receptacles on the bottom surface of the pager, aligned with the pins on the top surface so that pagers can be stacked on top of each other for recharging and, in one embodiment, data uploading and downloading.

In accordance with an improvement of the present invention, the game pager 20 also includes a pass-through hole 27 in the pager's casing. The pass-through hole provides a field of view for an internally mounted camera. As noted above, the camera is used to overcome the problem of fraudulent surveys that are actually filled out by employees rather than customers. The camera covertly takes a photograph of the participant taking the survey, and the pager uploads the photograph together with the survey answers to a management site for review. The camera implementation is discuss in more detail below in connection with FIG. 7.

Figure 4:
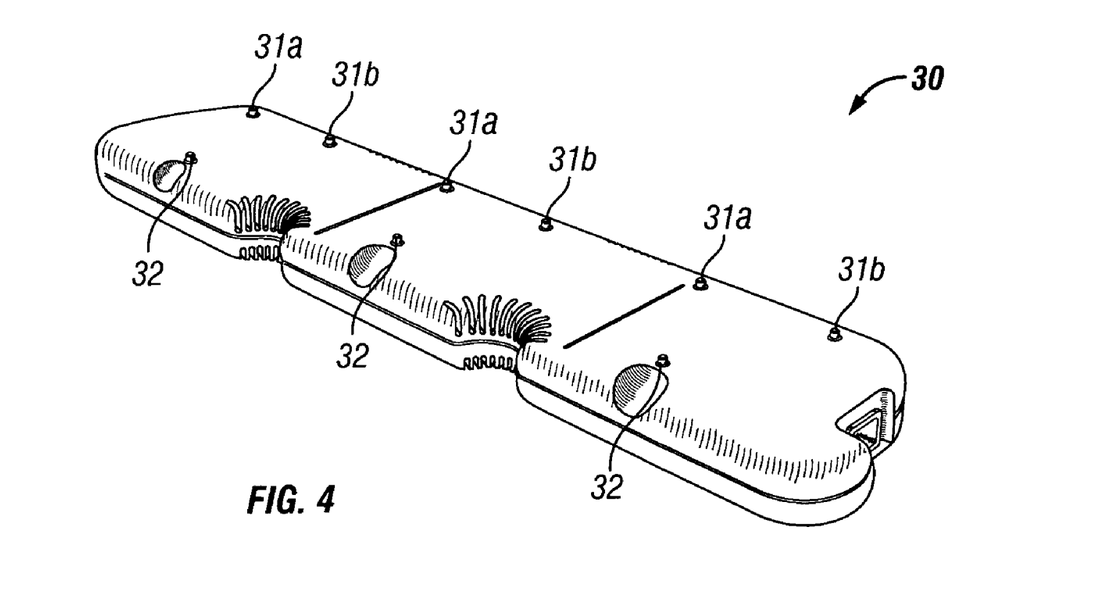
FIG. 4 is a perspective view of an exemplary embodiment of a base unit for stacking and recharging game and survey pagers.

FIG. 4 is a perspective view of an exemplary embodiment of a base unit 30 for stacking and recharging game and survey pagers. In the embodiment illustrated, the base unit includes three stations for stacking pagers. Each station includes two charging pins 31a and 31b, and a third pin 32. The third pin 32 may be a data pin utilized to transfer data to and from the game and survey pagers, or a dummy pin to provide physical support to pagers stacked above, depending on the embodiment.

Figure 5:
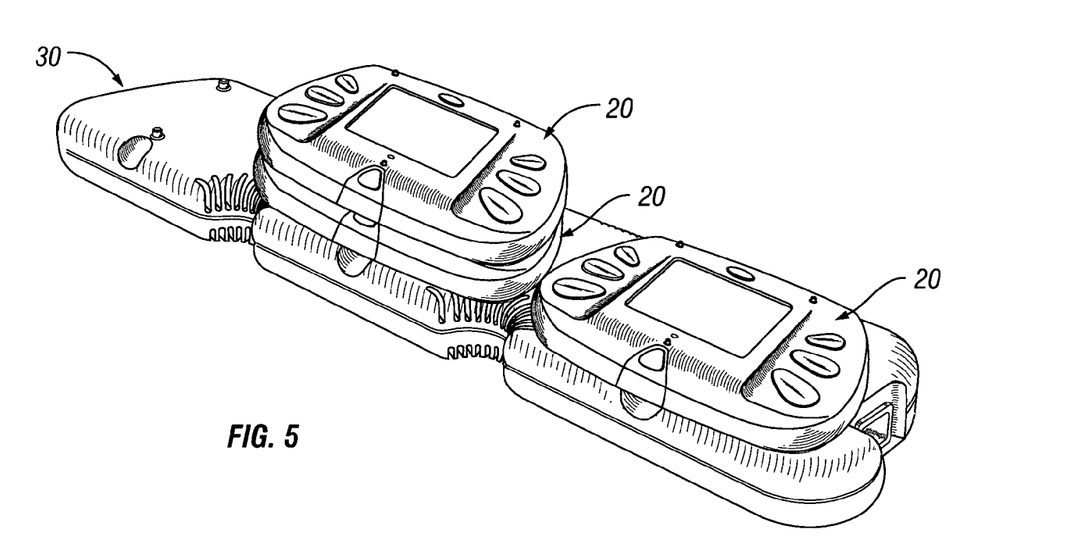
FIG. 5 is a perspective view of the base unit and a plurality of game and survey pagers stacked thereon in an exemplary embodiment of the present invention.

FIG. 5 is a perspective view of the base unit 30 and a plurality of game and survey pagers 20 stacked thereon in an exemplary embodiment of the present invention. In this embodiment, up to ten game and survey pagers may be stacked on each of the three stations of the base unit for simultaneous recharging and data uploading and downloading. Therefore, up to thirty game and survey pagers may be stacked on a single base unit. Other embodiments of the base unit may have a fewer or greater number of stations. For example, some embodiments may have only one or two stations, enabling up to ten or twenty game and survey pagers, respectively, to be stacked on a single base unit.

Figure 6:
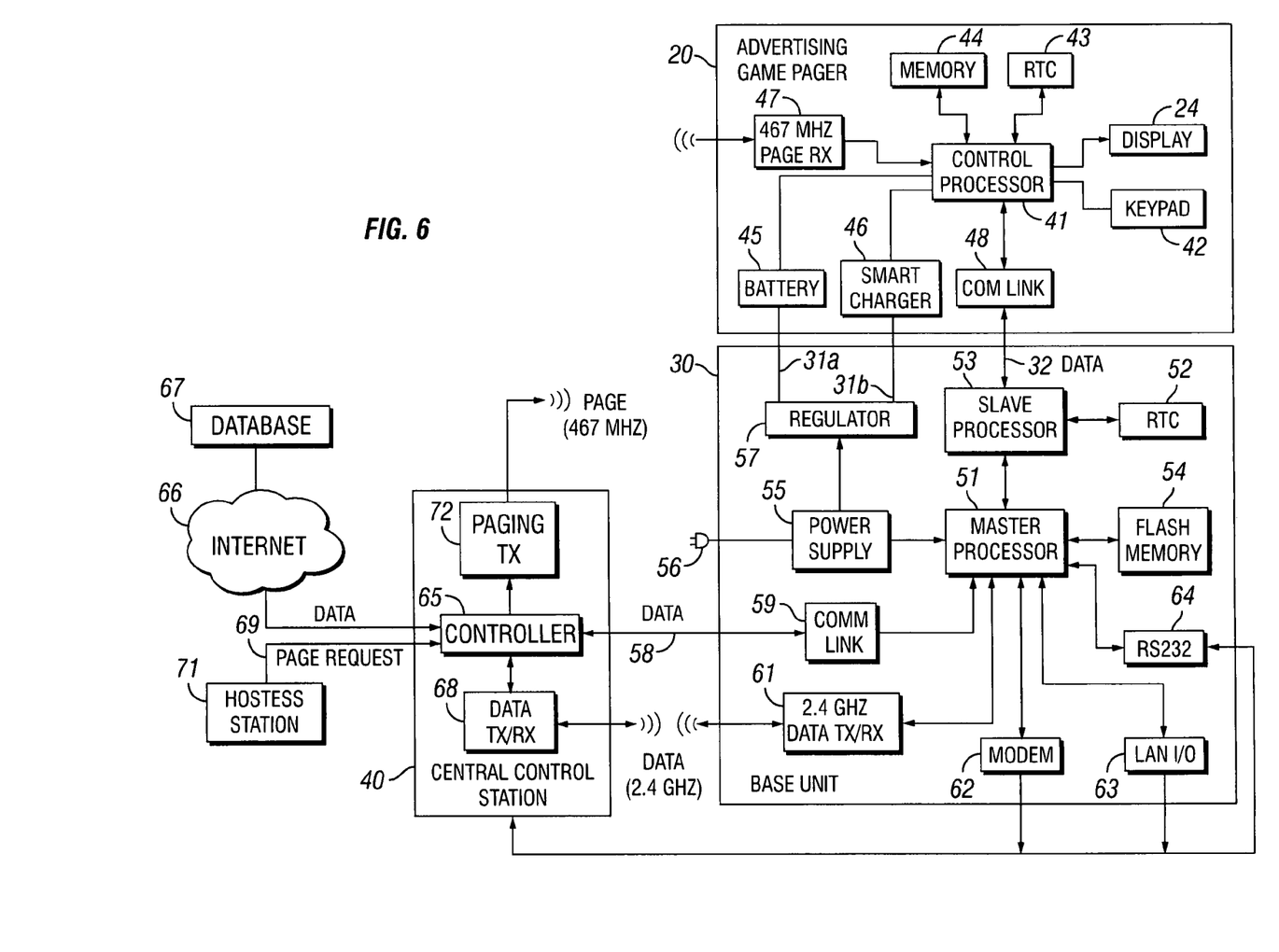
FIG. 6 is a simplified block diagram of an exemplary embodiment of a
Combination Paging and Gaming System.

FIG. 6 is a simplified block diagram of an exemplary embodiment of a combination paging and gaming system. The system includes the game and survey pager 20, the base unit 30, and a central control station 40. The game and survey pager includes a control processor 41 for controlling the operation of the pager. A keypad 41 includes the keys 21a-21d, 22, and 23a-23b described in connection with FIG. 3 above. The display 24 is preferably an LCD display. The pager may also include a speaker (not shown) for delivering audio messages. A real time clock (RTC) 43 provides timing and time-of-day information to the control processor. A memory 44 stores game questions and answers, odds for games of chance, advertising information, customer satisfaction survey questions, and survey answers. The pager is powered by a battery 45, which is charged by a smart charger 46 whenever the pager is placed on the base unit or on top of another pager in a stack on the base unit.

In this embodiment, the game and survey pager receives paging signals and data through two separate avenues. Paging signals are received through a page receiver 47. The page receiver may be a UHF receiver operating, for example, at approximately 467 MHz. Paging in the UHF frequency band ensures adequate range for on-premises paging. Data is received by the pager through a communications link 48. The communications link may receive the data through the base unit data pin 32 when the pager is stacked on the base unit 30. Alternatively, the data may be modulated on the power pins 31a and 31b. The pager may also include a low power transmitter (not shown) that transmits a low power signal that is sensed by a loss prevention receiver located by the exit door of the restaurant, such as an RFID tag.

The base unit 30 includes a master processor 51 for controlling the operation of the base unit. An RTC 52 provides actual time of day to a slave processor 53, which provides data to the communications link 48 in the pager 20. A flash memory 54 temporarily stores information that is provided to or received from the pager. A power supply 55 receives power from an external AC source 56, powers the base unit, and powers a regulator 57, which provides power to the recharging pins 31a and 31b.

The base unit 30 receives and sends data through several alternative avenues. In one embodiment, data such as game questions and answers, odds for games of chance, advertisements, satisfaction survey questions, and time-of-day may be received from the central control station 40 through a wireline connection 58 and communications link 59. Alternatively, in a wireless embodiment, the data may be transmitted to and from the central control station over a high bandwidth wireless connection. In this embodiment, the base unit includes a data transceiver (Tx/Rx) 61, which may operate, for example, at 2.4 GHz. The base unit may alternatively be connected to the central control station through a modem 62, a LAN I/O 63, or an RS232 connection 64.

The central control station includes a controller 65 for controlling the operation of the central control station. The controller may receive data such as game questions and answers, advertising information, and customer satisfaction survey questions from any suitable external source. FIG. 6 illustrates data being received through the Internet 66 from a database 67. In one embodiment, the controller sends the data to the base unit 30 over the wireline connection 58. In another embodiment, the controller sends the data to a data transceiver 68, which transmits the data to the base unit over a wireless broadband connection. When the controller receives a page request 69 from a hostess station 71, the controller activates a UHF paging transmitter 72 and transmits a page to the page receiver 47 in the game and survey pager 20.

Figure 7:
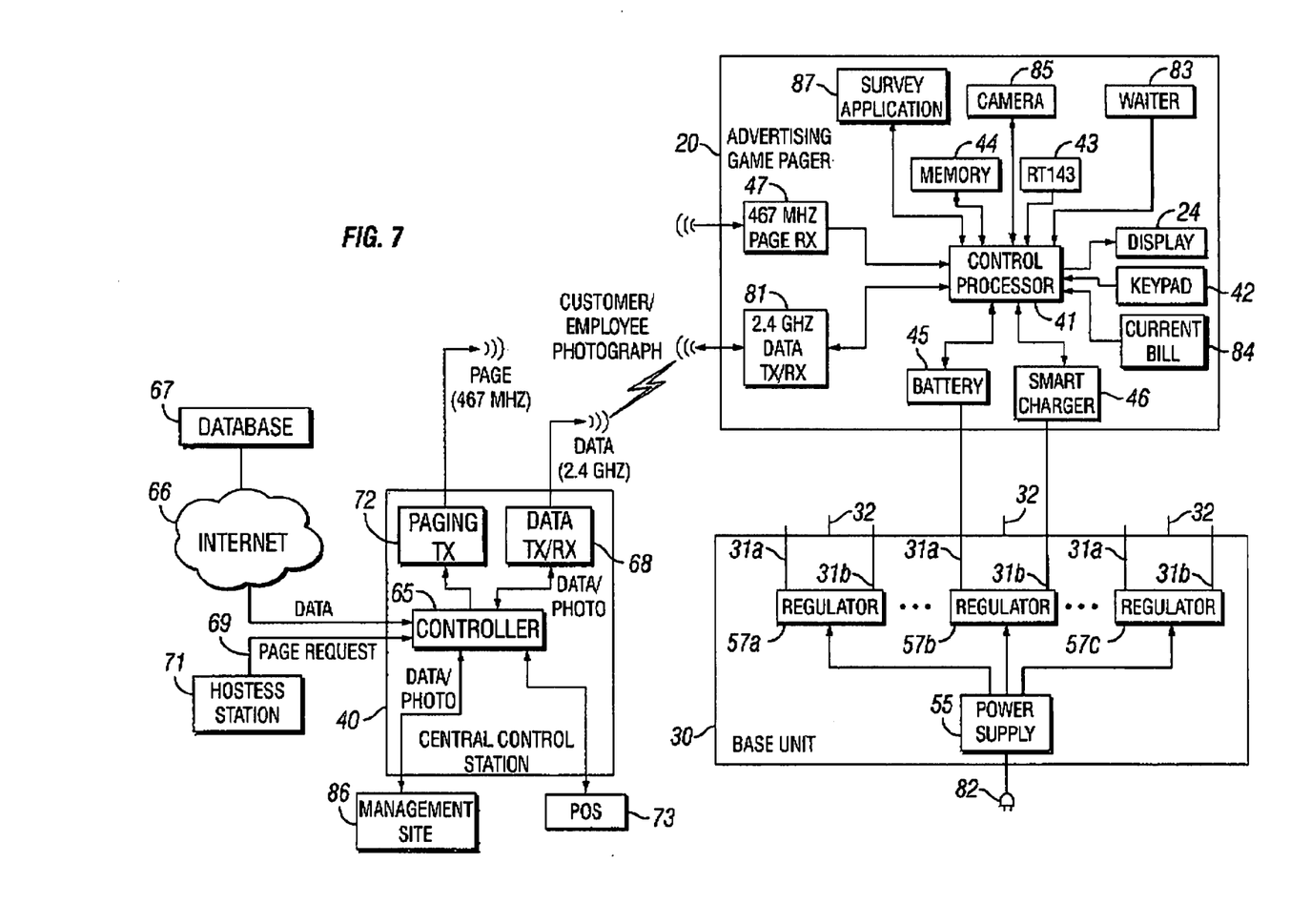
FIG. 7 is a simplified block diagram of an exemplary embodiment of a Combination Paging and Gaming System utilizing the game and survey pager and fraud-prevention camera of the present invention.

FIG. 7 is a simplified block diagram of an exemplary embodiment of a combination paging and gaming system utilizing the game and survey pager and fraud-prevention camera of the present invention. Like the embodiment of FIG. 6, the system includes the game and survey pager 20, the base unit 30, and the central control station 40. In this embodiment, however, the base unit is greatly simplified because it functions only as a recharging base. The base unit does not communicate data to or from the game and survey pager. Instead, each game and survey pager 20 includes a data transceiver (Tx/Rx) 81, which communicates data to and from the central control station 40 over a broadband wireless link operating, for example, at 2.4 GHz. Thus, the data Tx/Rx 68 in the central control station communicates directly with the game and survey pager.

The base unit 30 in this embodiment includes the power supply 55 and three regulators 57a-57c. The power supply connects to an external power source 82. Each regulator is connected to two recharging pins 31a and 31b located at each of the base unit's three recharging stations. The third pin 32 at each station is a dummy pin utilized only to provide physical support to pagers stacked on the base unit so that they remain level. Likewise, the third pin 26 on each pager is also a dummy pin.

In the embodiment described above, up to 30 game and survey pagers 20 may be stacked on the base unit 30 for recharging (up to 10 on each recharging station). In the embodiment of FIG. 7, a restaurant may typically upload data to the pagers and download data from the pagers after the restaurant is closed, while the pagers are stacked on the base unit for recharging. For example, the pagers may all be programmed with 1,000 trivia questions overnight. The questions may be indexed by question numbers. Then, when in use, the central control station 40 may transmit only an indication of which question number the pager is to display, and the pager then displays the appropriate question. This embodiment greatly reduces the wireless bandwidth required, since the text of the entire question does not have to be transmitted. In other embodiments, the trivia game is wholly contained in the pager, without interaction with the central control station.

The game and survey pager may also be programmed to sound an alarm and then deactivate if it is taken out of range of the central control station. This reduces the possibility that a customer may accidentally leave the premises with a pager, and it reduces the incentive for theft of the pagers since they are useless off the premises. Another feature of the system is a disablement "virus" that may be disseminated to all of the pagers if the restaurant does not properly honor its contract with the supplier of the pagers. For example, a disablement code can be downloaded through the base unit(s) to the pagers that disables the pagers until a proper reset code is entered. Alternatively, the disablement code may be manually entered on the keypad of an individual pager.

The central control station 40 may program the game and survey pagers 20 with advertising from various vendors. The advertising may include, for example, graphics, photographs, video sequences, audio tracks, and the like. The pagers may be programmed to periodically pop up a new advertisement on the pager's display screen after a predefined number of minutes have elapsed, or after a predefined number of game questions have been answered. The advertising may be interactive, and may give the customer the opportunity to request more information, which is stored in an internal memory in the pager. The customer may also provide feedback to questions from the advertiser, and may respond to promotional giveaways to earn restaurant discounts, free food, free drinks, or other prizes. The customers' advertising feedback may be retrieved from the game and survey pager during the nightly data download, either through the base unit or by wideband wireless connection to the central control station 40. The download may occur automatically when the pager is placed on the stack, or data may be downloaded from all of the pagers simultaneously after all of the pagers have been stacked and a command is given by the base unit or central control station. The advertising feedback may then be forwarded to a central data warehouse for analysis and action. The data warehouse may send e-mail reports/data to the e-mail accounts of registered advertisers.

By charging the advertisers a fee for advertising with the game pagers, the supplier of the pagers can then reduce the cost of the paging system to the restaurant owners by a proportional amount. With enough advertising revenue, the paging system may even be supplied to the restaurant free of charge.

FIG. 7 also shows that the controller 65 in the central control station 40 may interface with the restaurant's point-of-sale (POS) system 73. In this embodiment, the customer may retain the game and survey pager 20 when the customer is seated. When the hostess seats the customer's party, she inputs through the hostess station 71, the pager number and the associated table number where the party is seated. The POS system associates each table number with an assigned waiter, a food order, and a current balance of the customer's bill. By interfacing the controller 65 and the POS system 73, the controller is able to retrieve POS information associated with a given table number.

After the customer has been seated and his table number has been input to the controller 65, the customer can call his assigned waiter by pressing a waiter-button 83 on the pager. The 2.4 GHz data transceiver 81 transmits the request to the central control station 40. The controller associates the pager number with a table number and then pages the assigned waiter. The paging message may include the table number if the waiter is assigned multiple tables.

In this embodiment, the game and survey pager 20 also includes a "Current Bill" button 84. This button may be a programmable "soft key" or may be hard-coded. At any time during the meal, the customer can press the Current Bill button to retrieve his current bill from the POS system 73. The 2.4 GHz data transceiver 81 in the pager transmits the request to the central control station 40. The controller 65 in the central control station recognizes the pager number and associates it with the table number. The controller then retrieves the current bill information from the POS system using the table number to identify the proper bill. The information is then transmitted back to the pager using the data transceiver 68 in the central control station. The pager receives the information and displays it on the display screen 24.

The "Current Bill" feature can be particularly useful when a customer is buying food or drinks for a group of people and has a budget limit. In the past, the customer had to check with the waiter periodically to determine whether additional purchases could be made. This could be an awkward situation. Alternatively, the customer had to rely on the waiter to periodically check the current bill and notify him when the limit was reached. This was often worrisome for the customer, especially when the waiter was very busy and likely to forget to monitor the bill. The present invention enables the customer to discretely monitor the current bill himself.

If the customer responds to a special promotion advertised on the game pager, an indication may be sent by the 2.4 GHz data transceiver 81 in the pager to the central control station 40 and the POS system 73. In response, the POS system may apply an advertised instant discount to the customer's bill.

Another novel feature of the present invention is a "tab-at-the-table" feature that provides the customer with the ability to electronically pay his/her bill utilizing the pager. After the customer has retrieved the bill from the POS system, the pager queries whether the customer wants to pay the bill. If the customer indicates he desires to pay, the pager may prompt the customer to enter a tip amount. The pager may provide suggested tip amounts for various percentages of the bill (for example, 10, 12.5, 15, 17.5, and 20 percent), calculated either by the pager or the POS system. After the customer enters the tip amount, the pager displays the total amount of the bill and requests the customer to enter a credit or debit card number (and any other necessary information) in the pager. For security, the pager may also request other information such as, for example, the ZIP code of the customer's billing address. The payment information may be entered through the keypad 42. In another embodiment, the pager may be equipped with an optical or electronic reader such as a magnetic strip reader, which reads the customer's credit or debit card information.

The tip amount (or total bill), the credit or debit card number, and any other entered information may then be sent, for example, by the 2.4 GHz data transceiver 81 in the pager to the central control station 40 and the POS system 73. The POS system obtains authorization for the credit or debit card charge in the usual manner and returns an indication to the pager that the bill has been paid. The system also notifies the waiter that the bill has been paid. The pager may also ask the customer if a receipt is desired. If so, the POS system prints a receipt. In some restaurants, the receipt may be printed in a location from which the waiter can take the receipt to the customer's table. In other restaurants, the receipt may be printed at a cashier's station at the restaurant doorway. The customer merely provides the cashier with the pager, which indicates that the bill has been paid, and the cashier provides the printed receipt to the customer.

The interface between the controller 65 and the POS system 73 may also include date and time information. If a customer responds to survey questions, the customer feedback is stored with the table number and the date and time information. Thereafter, a manager can review the survey response and associate the feedback with the customer's meal, waiter, and the like.

As previously noted, to overcome the existing problem of fraudulent customer-satisfaction surveys that are actually filled out by employees rather than customers, the game pager includes a camera 85 that covertly takes a photograph of the participant taking the survey. The pager may wirelessly upload the photograph through the 2.4 GHz data transceiver 81 to the central control station 40. From there, the photograph may be forwarded to a management site 86 where the photograph is used to confirm that the participant was not an employee. This should greatly reduce employee fraud and significantly increase the validity of the data collected in the customer surveys.

The camera 85 may be a small device such as, for example, a Complementary Metal-Oxide-Semiconductor (CMOS) sensor or a Charge-Coupled Device (CCD) sensor. The camera is mounted internally in the game pager. For example, the camera may be mounted on the pager's circuit board with a lens positioned in a pass-through hole 27 (FIG. 3) in the casing. When triggered, the camera captures a photograph of whatever the lens is facing at the time. In one embodiment, firmware controls when the camera is triggered. For example, the camera may be triggered when the game pager is in customer-survey mode, and the participant has pressed a key to end and store his responses. In another embodiment, a survey software application 87 may set triggers for the camera at one or more times during the survey process, or at random or fixed intervals. Thus, the camera may capture an image at random times during each survey, at the end of each survey, during randomly or periodically selected surveys, whenever an exceedingly good or bad rating is given, or otherwise as controlled by the survey application. Of course the invention is not limited to these enumerated examples, but also includes other possible triggering events causing the camera to activate.

The images may be stored in the game pager, and may be uploaded later in a separate folder when the customer survey information is uploaded for review. Each of the images may be data/time stamped at the time the photograph was taken, and may include any pertinent data identifying when and where the survey was taken so that it can be associated with the employee responsible for that table at that time. The data may include, for example, Employee Name/PIN, Table ID, or location ID and the like.

In one embodiment, the uploaded surveys are stored in a management database. A database management system compiles reports from the surveys for presentation of data and identification of trends to management. A restaurant manager may request and receive more detail about a specific survey, including viewing of the associated photograph so that the authenticity of the survey can be verified.

Figure 8:
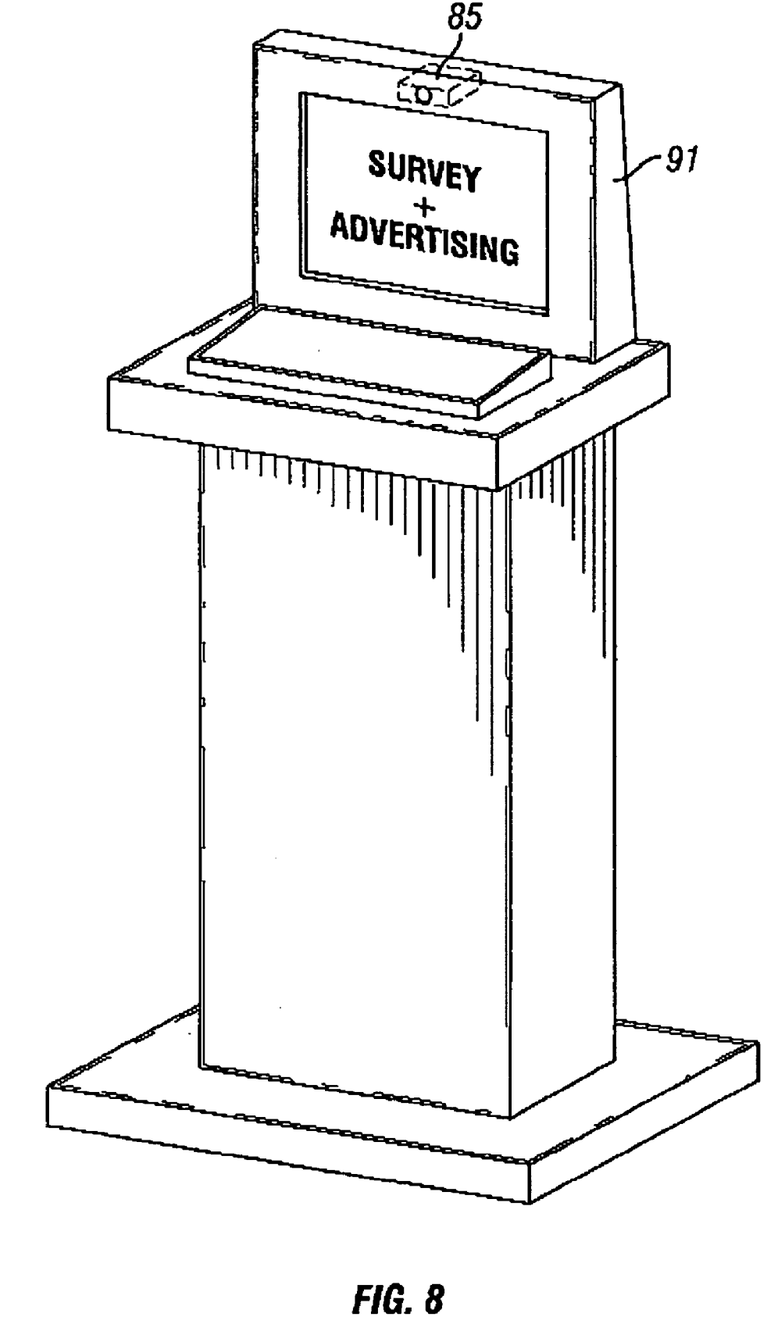
FIG. 8 is an illustration of an exemplary embodiment of a kiosk suitable for implementing the present invention.

FIG. 8 is an illustration of an exemplary embodiment of a kiosk 91 suitable for implementing the present invention. In other embodiments, the camera 85 and fraud prevention system described above is implemented in customer survey devices other than game pagers. For example, some restaurants may utilize tip trays that include electronic circuitry enabling a customer to take a customer satisfaction survey. Other restaurants may use standalone kiosks or PCs with customer survey systems. The camera 85 may also be implemented in such a tip tray, kiosk, or with a PC to reduce survey fraud. Once again, the photographs may be uploaded to a management site for review. Other devices, such as smart phones (e.g., iPhone), notebook computers, or smart pads (e.g., iPad) may also be programmed to perform customer satisfaction surveys. Some of these devices already include a camera, and need only be modified to take the photographs at specified times during customer surveys and to upload the photographs of survey participants to the management review site. Additionally, such devices are generally preprogrammed to make an overt shutter noise when a photograph is taken so that the user will know that the camera worked. For use in survey fraud prevention, this feature may be overridden so that no noise is made when the camera operates.

It is thus believed that the operation and construction of the present invention will be apparent from the foregoing description. While the system and apparatus shown and described has been characterized as being preferred, it will be readily apparent that various changes and modifications could be made therein without departing from the scope of the invention as defined in the following claims.

What is claimed is:

1. A customer-survey device for use by a customer in a business establishment, the customer-survey device comprising:
    means for presenting questions to the customer regarding the customer's level of satisfaction with the business establishment or its products or services;
    means for electronically recording the customer's answers to the questions; and
    means for detecting when an employee fraudulently takes the customer-satisfaction survey instead of the customer.

2. The device according to claim 1, wherein the means for detecting when an employee fraudulently takes the customer-satisfaction survey includes:
    a camera for taking a photograph of an individual taking the customer-satisfaction survey; and
    means for associating the photograph with the customer-satisfaction survey.

3. The device according to claim 2, wherein the device is implemented in a kiosk.

4. The device according to claim 2, wherein the device is implemented in a computing device selected from a group consisting of a personal computer (PC), a laptop computer, a notebook computer, a smart phone, and a smart pad.

5. The device according to claim 2, wherein the camera is mounted internally in the device and operates silently so that the photograph is taken covertly.

6. The device according to claim 5, further comprising firmware for controlling the camera to activate when a predefined condition is met.

7. The device according to claim 5, further comprising a control processor and a memory for storing survey application program instructions, wherein when the processor executes the survey application program instructions, the camera is activated at predefined times or when predefined conditions are met.

8. The device according to claim 2, wherein the business establishment is a restaurant, and the device is implemented in a tip tray.

9. The device according to claim 2, wherein the business establishment is a restaurant, and the device is implemented in a combination pager and customer-survey device.

10. The device according to claim 9, further comprising means for uploading to a management database, the photograph together with associated information for identifying a waiter responsible for serving the customer.

11. The device according to claim 10, wherein the associated information includes a date/time stamp and a table number where the survey was taken.

12. The device according to claim 10, wherein the uploading means includes a data transceiver configured to transmit to a central control station, the photograph together with the associated information for identifying the waiter responsible for serving the customer.

13. The device according to claim 12, further comprising means for the customer to enter payment information, wherein the data transceiver is configured to transmit the payment information to the central control station.

14. The device according to claim 13, further comprising:
means for receiving from the customer, a request to obtain a current balance of the customer's bill;
means for requesting the current balance from the central control station;
means for receiving the current balance from the central control station; and
means for presenting the current balance to the customer.

15. The device according to claim 10, further comprising:
a button that the customer presses to activate a request for a waiter to come to the customer's table; and
a data transceiver configured to transmit the request to a central control station.

16. The device according to claim 2, further comprising an electronic game for playing by the customer.

17. The device according to claim 2, further comprising:
a memory for storing advertising; and
means for presenting the advertising to the customer.

* * * * *